(12) United States Patent  
Hosoi et al.

(10) Patent No.: US 9,618,872 B2  
(45) Date of Patent: Apr. 11, 2017

(54) OPTICAL SCANNING APPARATUS

(71) Applicant: CANON KABUSHIKI KAISHA, Tokyo (JP)

(72) Inventors: Shinichiro Hosoi, Tokyo (JP); Toshiharu Mamiya, Yokohama (JP); Hiroshi Nakahata, Abiko (JP); Yasuaki Otoguro, Abiko (JP); Yuta Okada, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/580,005

(22) Filed: Dec. 22, 2014

(65) Prior Publication Data

US 2015/0301472 A1  Oct. 22, 2015

(30) Foreign Application Priority Data

Dec. 25, 2013 (JP) ................. 2013-267130

(51) Int. Cl.  
G03G 15/04 (2006.01)  
G03G 21/16 (2006.01)  
G02B 26/10 (2006.01)  
G02B 26/12 (2006.01)

(52) U.S. Cl.  
CPC ..... *G03G 15/04036* (2013.01); *G02B 26/101* (2013.01); *G02B 26/123* (2013.01); *G03G 15/0409* (2013.01); *G03G 21/1666* (2013.01); G03G 2221/1678 (2013.01)

(58) Field of Classification Search  
CPC ................. G03G 21/1666; G03G 15/04036  
See application file for complete search history.

(56) References Cited

FOREIGN PATENT DOCUMENTS

| FR | WO 9501913 A1 * | 1/1995 | ............... B65D 5/20 |
| JP | S63-061864 U | 4/1988 | |
| JP | 2004301898 A | 10/2004 | |
| JP | 2006-150687 A | 6/2006 | |

OTHER PUBLICATIONS

JP_2006150687_A_T Machine Translation, Sakagami et al., Jun. 15, 2006.*  
JP_2006150687_A_T Machine Translation, Sakgami et al., Jun. 2006, Japan.*  
WO_9501913_A1_T Machine Translation, Levi et al., Jan. 1995, France.*  
WO_9501913_A1_T Machine Translation Jan. 1995, Levi, FR.*  
JP_2006150687_A_T Machine Translation Jun. 2006 JP Sakagami.*

* cited by examiner

*Primary Examiner* — Clayton E Laballe  
*Assistant Examiner* — Victor Verbitsky  
(74) *Attorney, Agent, or Firm* — Canon U.S.A. Inc., IP Division

(57) ABSTRACT

During an operation of assembling a cover on an optical box, a cover-side engaging portion comes into contact with a side wall of the optical box and hence is deformed. An optical scanning apparatus is configured so that a distal end portion of a protrusion and an apex portion of a side wall of an optical box pass each other prior to a distal end portion of a cover-side engaging portion.

10 Claims, 6 Drawing Sheets

OPTICAL SCANNING APPARATUS

BACKGROUND OF THE INVENTION

Field of the Invention

This disclosure relates to an optical scanning apparatus configured to allow optical members such as a rotary polygonal mirror to be mounted in an internal space closed by a cover.

Description of the Related Art

In the related art, an image forming apparatus of an electrophotographic system is provided with an optical scanning apparatus configured to emit a light beam on the basis of image data. The optical scanning apparatus is provided with optical members such as a rotary polygonal mirror configured to deflect a light beam emitted from a light source so as to allow the light beam to scan on a photosensitive member, lenses configured to guide the light beam deflected by the rotary polygonal mirror onto the photosensitive member, and reflective mirrors.

With the scanning with the light beam emitted from the optical scanning apparatus, an electrostatic latent image on the basis of image data is formed on the photosensitive member provided in the image forming apparatus. The electrostatic latent image is developed with toner, and a toner image on the photosensitive member is transferred to a recording medium such as paper, whereby an image is formed on the recording medium.

The optical scanning apparatus is provided with an optical box, and a cover (lid) to be mounted on the optical box. The rotary polygonal mirror, the lens, and the mirror are installed in an internal space formed by the optical box and the cover.

Japanese Patent Laid-Open No. 2006-150687 discloses an optical scanning apparatus in which a cover is fixed to an optical box with a snap-fit mechanism. The snap-fit mechanism includes a cover-side engaging portion and a box-side engaging portion. With the engagement between the cover-side engaging portion and the box-side engaging portion, the cover is fixed to the optical box.

However, the optical scanning apparatus disclosed by Japanese Patent Laid-Open No. 2006-150687 may be subjected to the following problems at the time of assembly of the optical scanning apparatus or at the time of assembly of the cover after maintenance (cleaning of the rotary polygonal mirror, the lenses, and the mirror) of the optical scanning apparatus in a factory. In other words, there may be a case where the cover-side engaging portion which constitutes part of the snap-fit mechanism may abut against a side wall of the optical box or may enter the inside of the side wall of the optical box in the course of assembly of the cover to the optical box. At this time, if the pressure applied to the cover-side engaging portion is large, the cover-side engaging portion may be plastically deformed. If the cover-side engaging portion and the box-side engaging portion cannot be engaged as a result of plastic deformation of the cover-side engaging portion, the cover with the snap-fit mechanism cannot be fixed firmly to the optical box, and a gap is formed between the cover and the optical box. If dust enters from the gap, lowering of image quality may result.

In order to avoid such a problem, an operator is required to perform the assembly operation between the cover and the optical box carefully. However, there arises a problem of increase in assembly time required for a careful operation. In the case where the assembly operation of the cover and the optical box is performed an automatic machine, higher accuracy of an operation of the automatic machine is wanted, so that the design of the automatic machine may be complicated.

SUMMARY OF THE INVENTION

In order to solve the above-described problems, this disclosure provides an optical scanning apparatus including:
a light source configured to emit a light beam for exposing a photosensitive member;
a deflection unit configured to deflect the light beam emitted from the light source so as to scan the photosensitive member;
an optical box configured to house the deflection unit in an interior thereof;
a cover mounted on the optical box;
a plurality of box-side engaging portions provided at a plurality of positions on an outer side wall of the optical box; and
a plurality of cover-side engaging portions provided to the cover in pairs with the plurality of box-side engaging portions, wherein the plurality of cover-side engaging portions and the plurality of box-side engaging portions engage respectively with each other to fix the cover to the optical box, and the cover-side engaging portions provided to the plurality of positions on the cover so as to oppose the side wall where the box-side engaging portions in pairs are provided in the state in which the cover-side engaging portions and the box-side engaging portions engage respectively with each other,
the cover includes a plurality of protrusions extending from the cover so as to oppose the side wall in the state in which the cover is mounted on the optical box, and
the plurality of protrusions and the cover-side engaging portions provided to the cover so that a distal end of at least one of the plurality of protrusions and an apex portion of the side wall pass each other prior to timing when distal ends of the cover-side engaging portions and the apex portion of the side wall of the optical box pass each other when mounting the cover on the optical box.

Further features of the present invention will become apparent from the following description of exemplary embodiments with reference to the attached drawings.

DESCRIPTION OF THE EMBODIMENTS

EXAMPLE 1

Hereinafter, examples will be described with reference to the drawings.

Image Forming Apparatus

Figure 1:
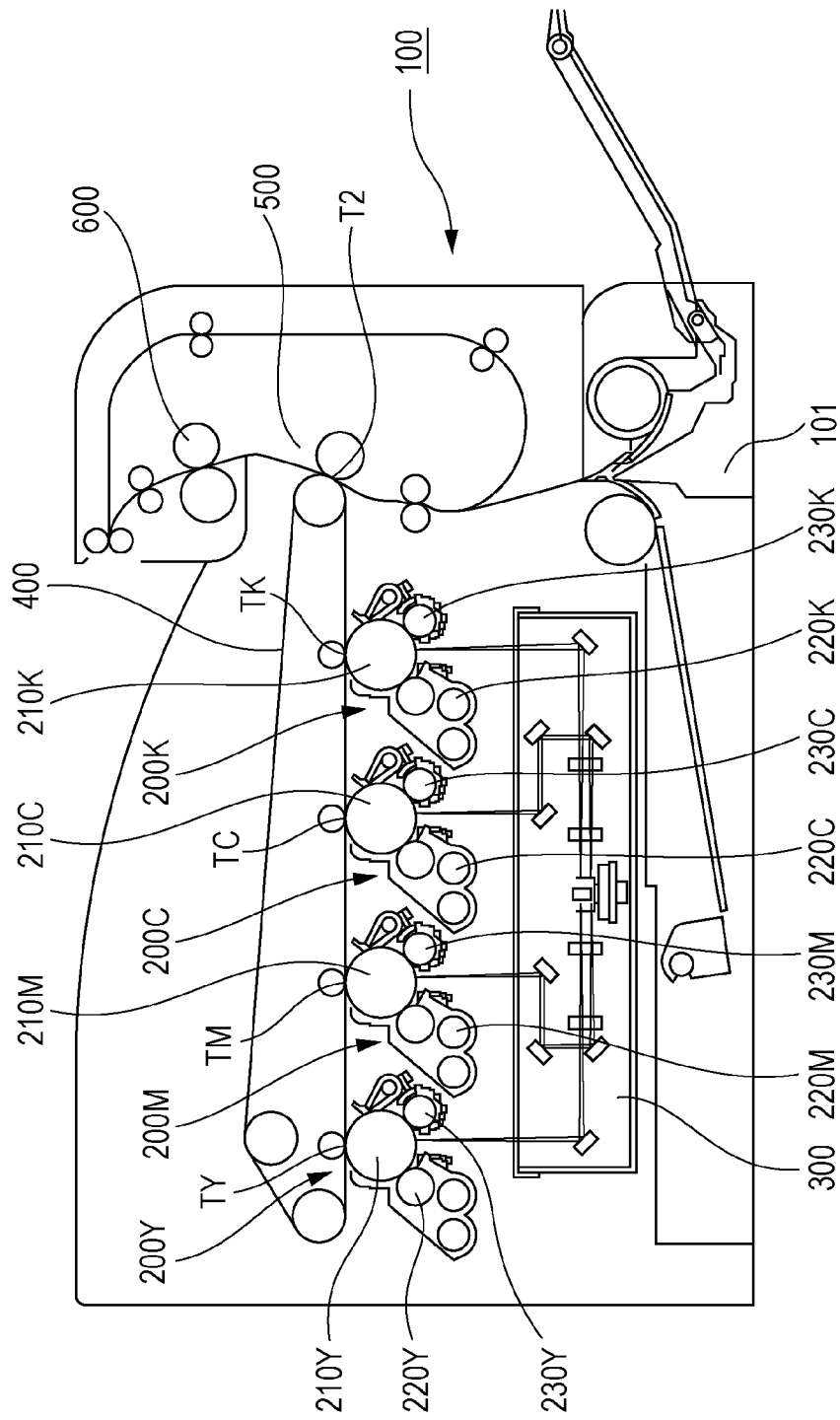
FIG. 1 is a cross-sectional view of an image forming apparatus.

FIG. 1 is a schematic cross-sectional view of a principal portion of an image forming apparatus of Example 1. An image forming apparatus 100 of Example 1 includes a feed unit 101 configured to supply recording sheets, which are recording media, and four image forming units 200Y, 200M, 200C, and 200K configured to form toner images of yellow (Y), magenta (M), cyan (C), and black (K) respectively. The image forming apparatus 100 of Example 1 includes photosensitive drums 210Y, 210M, 210C, and 210K (photosensitive members), charging rollers 230Y, 230M, 230C, and 230K configured to charge the photosensitive drums respectively, and developing units 220Y, 220M, 220C, and 220K configured to develop electrostatic latent images formed on the respective photosensitive drums by using toners of respective colors. The image forming apparatus 100 of Example 1 includes an optical scanning apparatus 300, an intermediate transfer belt 400, a transfer device 500, and a fixing device 600.

Subsequently, an image forming process will be described. Since the image forming processes of respective colors are the same, in the following description, suffixes Y, M, C, and K are omitted. The photosensitive drum 210 is charged by the charging roller 230. The charged photosensitive drum 210 is exposed by a light beam emitted from an optical scanning apparatus. By being exposed by the light beam, an electrostatic latent image is formed on the photosensitive drum 210 (photosensitive member). The electrostatic latent image is developed by the developing unit 220.

The toner images formed on the respective photosensitive drums are transferred to the intermediate transfer belt 400 at respective transfer positions (TY, TM, TC, and TK) for respective colors. The transfer device 500 transfers the tone images on the intermediate transfer belt 400 to a recording sheet conveyed from the feed unit 101 to a transfer position T2 at the transfer position T2. The fixing device 600 fixes the toner image transferred to the recording sheet to the recording sheet with heat.

Optical Scanning Apparatus

Figure 2A:
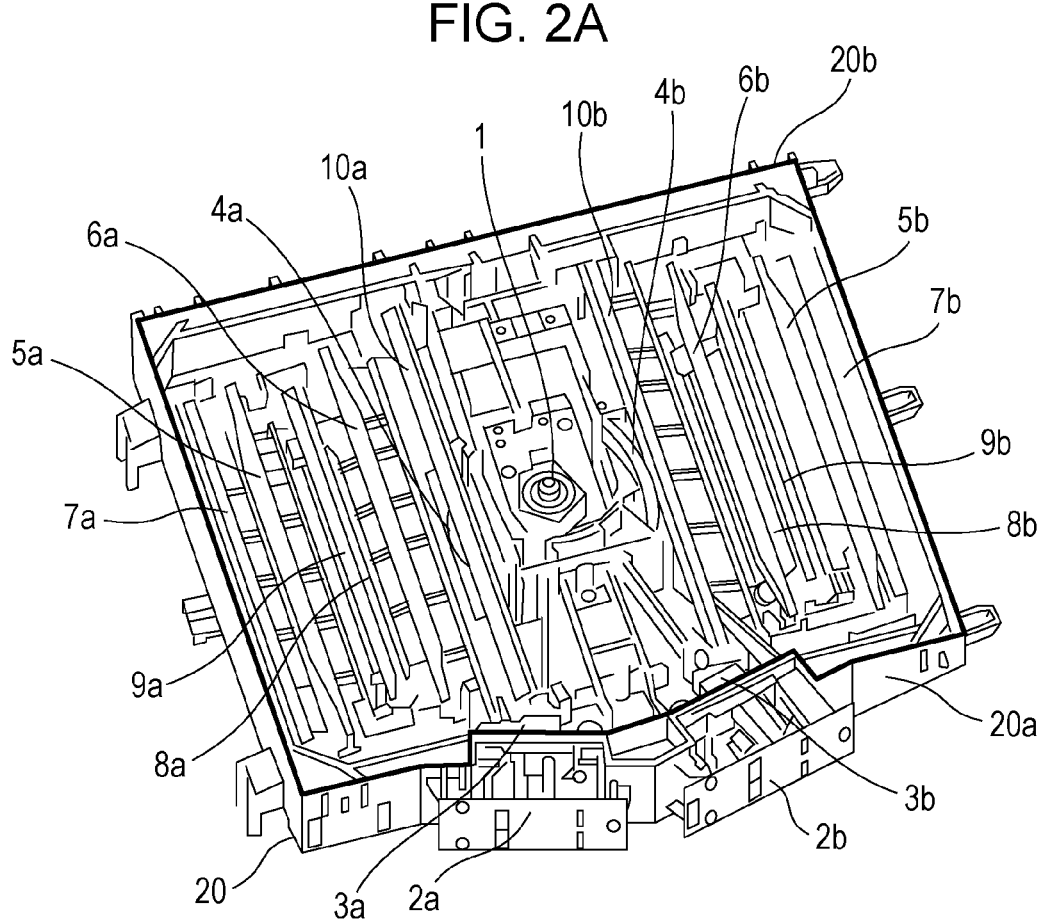
FIGS. 2A and 2B are perspective views of an optical scanning apparatus.

Subsequently, the optical scanning apparatus 300 will be described with reference to FIGS. 2A and 2B. FIG. 2A is a perspective view illustrating an internal configuration of the optical scanning apparatus in the state in which a cover 30 (lid) described later is not mounted on an optical box 20.

A laser unit 2a includes two light sources for exposing the photosensitive drum 210Y and the photosensitive drum 210M, respectively. In contrast, a laser unit 2b includes two light sources for exposing the photosensitive drum 210C and the photosensitive drum 210K, respectively. The light sources provided on the respective laser units are held temporarily by a laser holder 12a and a laser holder 12a, and the laser holders 12a and 12b are fixed to the optical box 20 with screws.

Laser light beams of yellow and magenta emitted from the laser unit 2a are deflected leftward of a polygon mirror 1 (rotary polygonal mirror) in the drawing, and laser light beams of black and cyan emitted from the laser unit 2b scan rightward of the polygon mirror 1. Scanning optical systems of optical members (lenses, reflective mirrors, and the like) configured to guide the respective light beams to the corresponding photosensitive drums are arranged on both sides with the polygon mirror interposed therebetween. The polygon mirror 1, the lenses, and the reflective mirrors are housed in an interior of the optical box 20.

The optical box 20 is provided with a side wall 20a. In FIG. 2A, a portion emphasized by a thick line indicates an apex portion 20b of the side wall 20a of the optical box 20 extending from a bottom portion of the optical box 20 configured to house the polygon mirror, the lenses, and the reflective mirrors installed therein. When assembling the optical scanning apparatus 300, the polygon mirror 1, the lenses, and the reflective mirrors are inserted into the optical box 20 from an opening formed by the apex portion 20b of the side wall 20a and are installed on the bottom portion of the optical box 20.

Figure 2B:
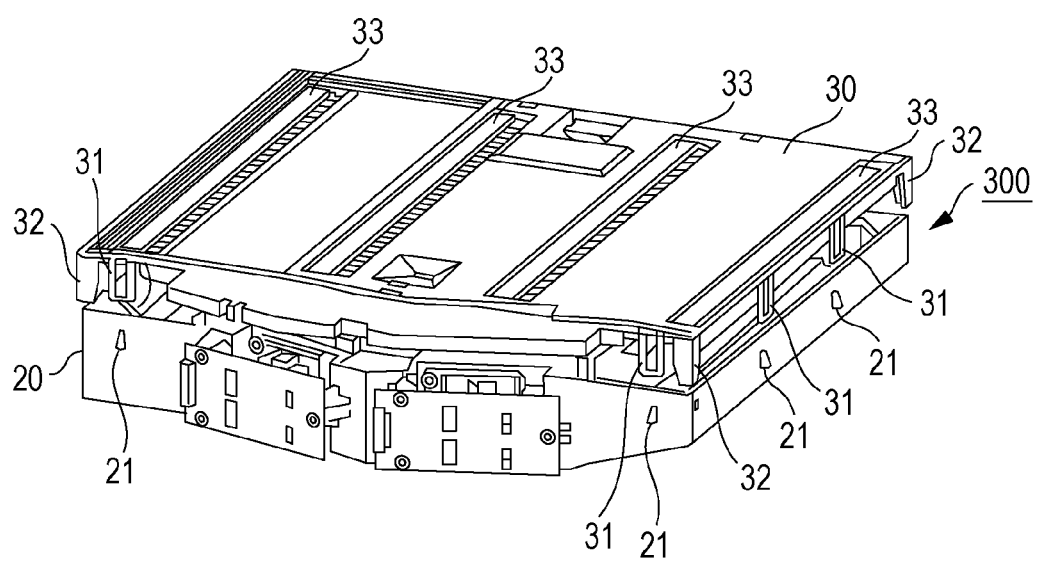

FIG. 2B is a perspective view illustrating the optical box 20 and the cover 30. Here, a space for installing the 5, the lenses, and the reflective mirrors in the state in which the cover 30 is mounted on the optical box 20 is defined as the interior of the optical box 20, and a space outside the optical box 20 and the cover 30 is defined as an exterior thereof. As illustrated in FIG. 2B, the side wall 20a of the optical box 20 (the outside of the optical box 20) is provided with a plurality of protrusions as optical box-side engaging portions 21 integrally with an engaging portion. The optical box-side engaging portion 21 is provided with an engaging surface 21a and an inclined portion 21b. The optical box-side engaging portion 21 will be described later.

Cover

Figure 3:
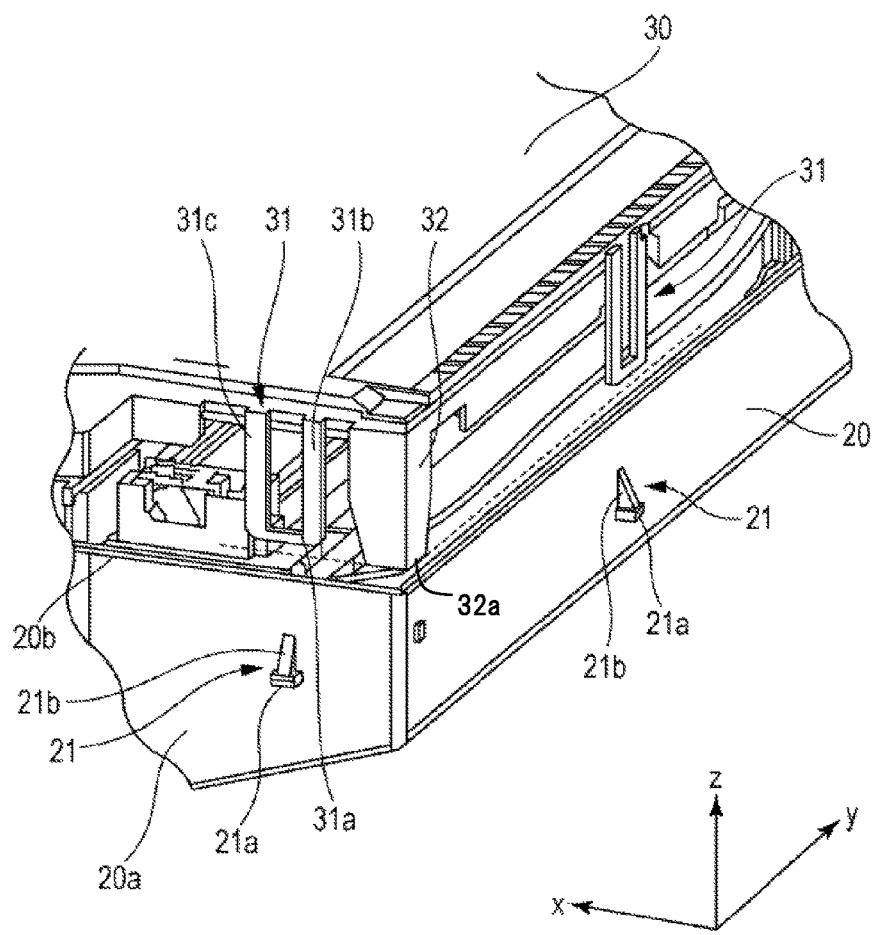
FIG. 3 is an enlarged perspective view of a principal portion of an optical box and a cover.

Subsequently, the cover 30 will be described with reference to FIG. 2B and FIG. 3. FIG. 3 is an enlarged view of a corner of the optical box 20 and the cover 30.

As illustrated in FIG. 2B, the cover 30 closes the opening formed by the apex portion 20b of the side wall 20a. The cover 30 is provided with four transparent windows 33Y, 33M, 33C, and 33K. The light beams that expose the respective photosensitive drums 210Y, 210M, 210C, and 210K pass the corresponding transparent windows. The cover 30 of Example 1 is a resin member. However, the cover 30 may be a metallic member.

As illustrated in FIG. 3, the cover 30 is provided with a plurality of cover-side engaging portions 31. The cover-side engaging portions 31 are formed integrally with the cover 30.

The plurality of cover-side engaging portions 31 are each provided with an arm portion 31b and an arm portion 31c extending from (provided to) the cover 30. When assembling the optical scanning apparatus, the cover 30 is moved toward the optical box 20 in a Z-axis direction, or the optical box 20 is moved toward the cover 30 in the Z-axis direction to mount the cover 30 on the optical box 20. The arm portion 31b and the arm portion 31c extend (project) from the cover 30 so as to extend along the side wall of the optical box 20 in a direction of relative movement of the cover 30 and the cover 30 with respect to the optical box at the time of assembly of the optical scanning apparatus.

The plurality of cover-side engaging portions 31 are each provided with a coupling portion 31a configured to couple the arm portion 31b and the arm portion 31c.

Snap-Fit Mechanism

Figure 4A:
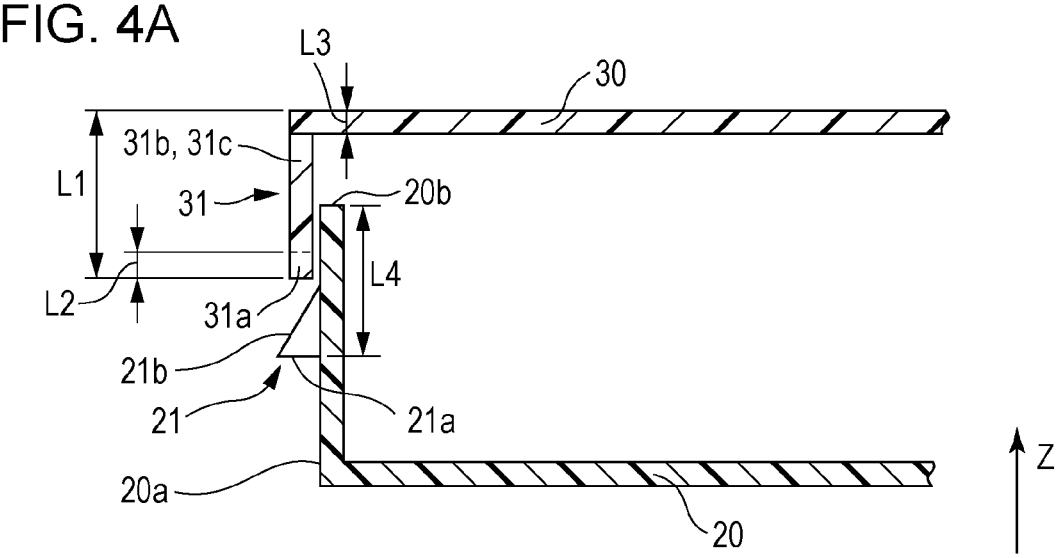
FIGS. 4A, 4B, and 4C are enlarged cross-sectional views of the principal portion of the optical box and the cover.
Figure 4B:
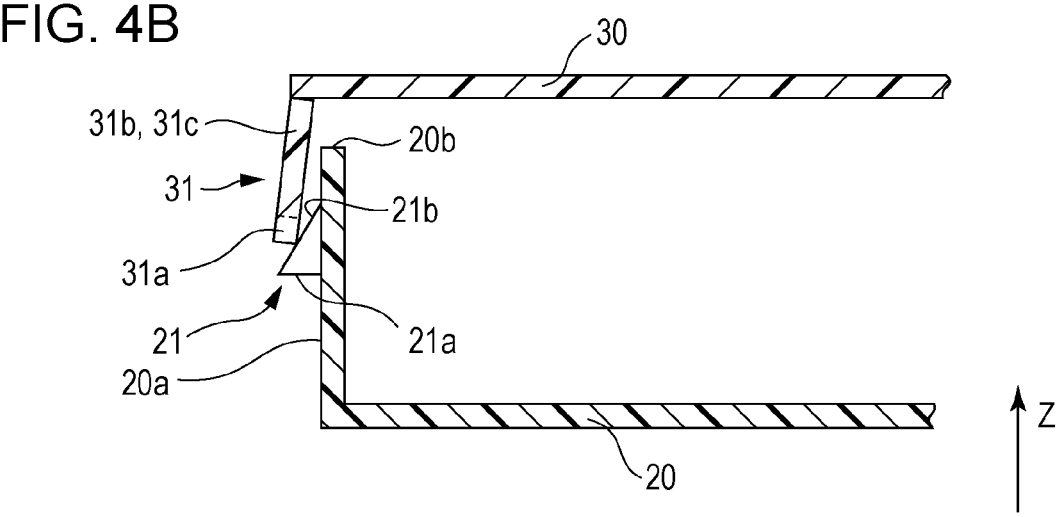
Figure 4C:
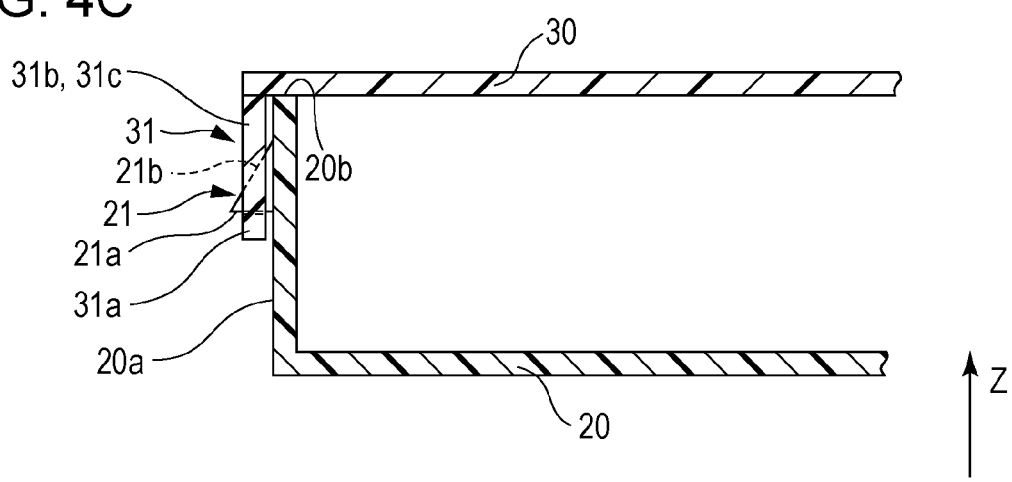

The cover 30 is fixed to the optical box 20 by a snap-fit mechanism including the optical box-side engaging portions 21 and the cover-side engaging portions 31. As illustrated in FIGS. 4A to 4C, when assembling the optical scanning apparatus, if the distance between the optical box 20 and the cover 30 in the Z-axis direction (a direction of protrusion of the cover-side engaging portion 31) is reduced from the state illustrated in FIG. 4A, the coupling portion 31a of the cover-side engaging portion 31 abuts against the inclined portion 21b of the optical box-side engaging portion 21. If the distance between the optical box 20 and the cover 30 is further reduced from this state, the coupling portion 31a slides on the inclined portion 21b, and the arm portion 31b and the arm portion 31c are resiliently deflected away from the side wall 20*a* of the optical box 20 (FIG. 4B). When the cover 30 and the apex portion 20*b* of the optical box 20 come into contact with each other, the coupling portion 31*a* climbs over the inclined portion 21*b*. When the coupling portion 31*a* climbs over the inclined portion 21*b*, the arm portion 31*b* and the arm portion 31*c*, which have been resiliently deformed so as to be deflected are restored to shapes extending along the side wall 20*a*, whereby the engaging surface 21*a* formed substantially perpendicular to the side wall 20*a* of the optical box 20 and the surface of the coupling portion 31*a* on the cover 20 side engage each other (FIG. 4C). In this state, the relative positional relationship between the cover 30 and the optical box 20 is fixed at least in the Z-axis direction.

Dimensions of the positions of the optical box-side engaging portion 21 and the cover-side engaging portion 31 are as follows.

L1=27 mm
L2=5 mm
L3=4 mm
L4=18 mm

The entire length of the cover-side engaging portion 31 from the cover 30 is 27 mm.

The resilient member may be compressed by the cover 30 and the apex portion 20*b* to fill a minute gap between the cover 30 and the apex portion 20*b* in order to improve dust-proof properties of the optical scanning apparatus 300.

Protrusions Provided on Cover

Subsequently, protrusions 32 provided on the cover 30 will be described with reference to FIG. 2B, FIG. 3, and FIGS. 5A, 5B, and 5C. The cover 30 is provided with the protrusions 32 having a length longer than that of the cover-side engaging portions 31 in the Z-axis direction in FIG. 3. As illustrated in FIG. 2B, the opening formed by the side wall 20*a* of the optical box 20 of Example 1 has a substantially rectangular shape. Therefore, the cover for closing the opening has a substantially rectangular shape. The protrusions 32 extend from four of the corners (four apexes of an outline of the cover 30) of the cover 30 having a substantially rectangular shape.

Figure 5A:
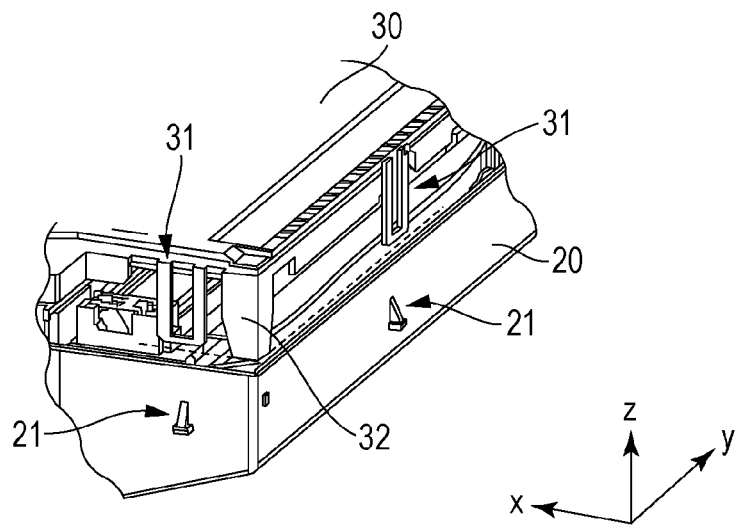
FIGS. 5A, 5B, and 5C are enlarged perspective views of the principal portion of the optical box and the cover.
Figure 5B:
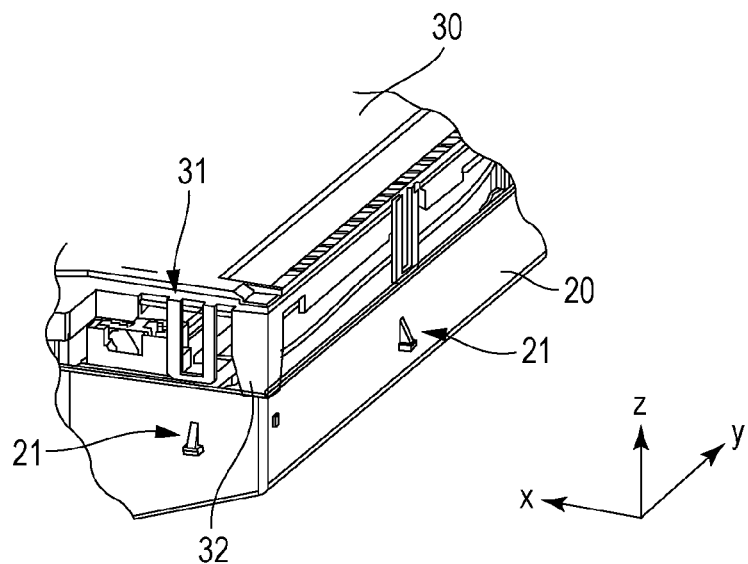
Figure 5C:
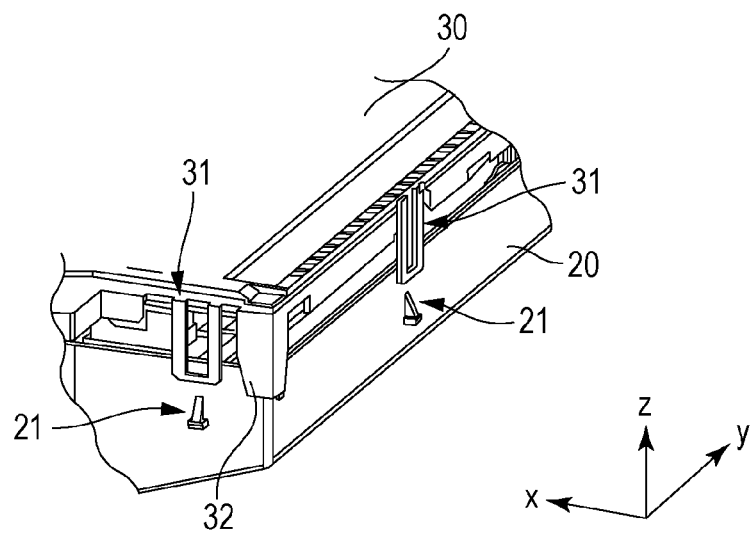

The protrusions 32 overlap (oppose) with the side wall of the optical box 20 prior to the overlapping of the cover-side engaging portions 31 with the outer side wall of the optical box 20 when mounting the cover 30 on the optical box 20 by moving the cover 30 in the Z-axis direction. FIG. 5A illustrates the state in which the cover-side engaging portions 31 and the protrusions 32 do not overlap with the side wall of the optical box 20. From this state, if the relative position between the cover 30 and the optical box 20 in the Z-axis direction is brought to be closer to engage the cover-side engaging portions 31 and the optical box-side engaging surfaces 21*a*, the distal end portions 32*a* of the protrusions 32 and the apex portions 20*b* of the side wall 20*a* of the optical box 20 pass each other. Subsequently, from this state, if the relative position between the cover 30 and the optical box 20 in the Z-axis direction is further brought to be closer, the distal end portions 31*a* of the cover-side engaging portion 31 and the apex portions 20*b* of the side wall 20*a* of the optical box 20 pass each other while moving in the Z-axis direction along the side wall 20*a*. The Z-axis direction is a direction substantially parallel to the direction of a rotating shaft of the polygon mirror.

The distal end portions 32*a* of the protrusions 32 function as guide members for determining the direction of relative movement between the cover 30 and the optical box 20 while moving in the Z-axis direction along the side wall 20*a*. In other words, while the distal end portions 32*a* of the protrusions 32 move along the side wall 20*a* of the optical box 20, the gap formed between the protrusion 32 and the optical box 20 is 1 mm or smaller, and if an attempt is made to move the cover 30 in an XY plane, the protrusions 32 and the side wall 20*a* of the optical box 20 come into contact with each other, the relative movement between the cover 30 and the optical box 20 within the XY plane is restricted.

In this manner, since the distal end portions 32*a* of the protrusions 32 and the apex portion 20*b* of the side wall 20*a* of the optical box 20 pass each other prior to the distal end portions 31*a* of the cover-side engaging portions 31, the relative movement between the cover 30 and the optical box 20 within the XY plane is restricted. Accordingly, the distal end portions 31*a* of the cover-side engaging portions 31 are restrained from coming into contact with the side wall 20*a*, so that plastic deformation of the cover-side engaging portions 31 may be restrained.

In Example 1, the protrusions 32 are provided at the four apexes of the cover 30. However, the protrusions 32 may be provided so as to extend from sides of the cover 30 which connects the four apexes (side end of the cover 30). The protrusions 32 are preferably provided so as to extend from both sides of the cover-side engaging portions 31. The protrusions 32 do not necessarily have to be provided on the sides of the cover 30, but may be provided so as to extend from an inner side of the sides of the cover. In addition, the protrusions 32 may be provided so as to extend along an inner side of the side wall of the optical box 20, and may be provided in the vicinity of the apexes where the side and the side of the cover 30 intersect.

Figure 6:
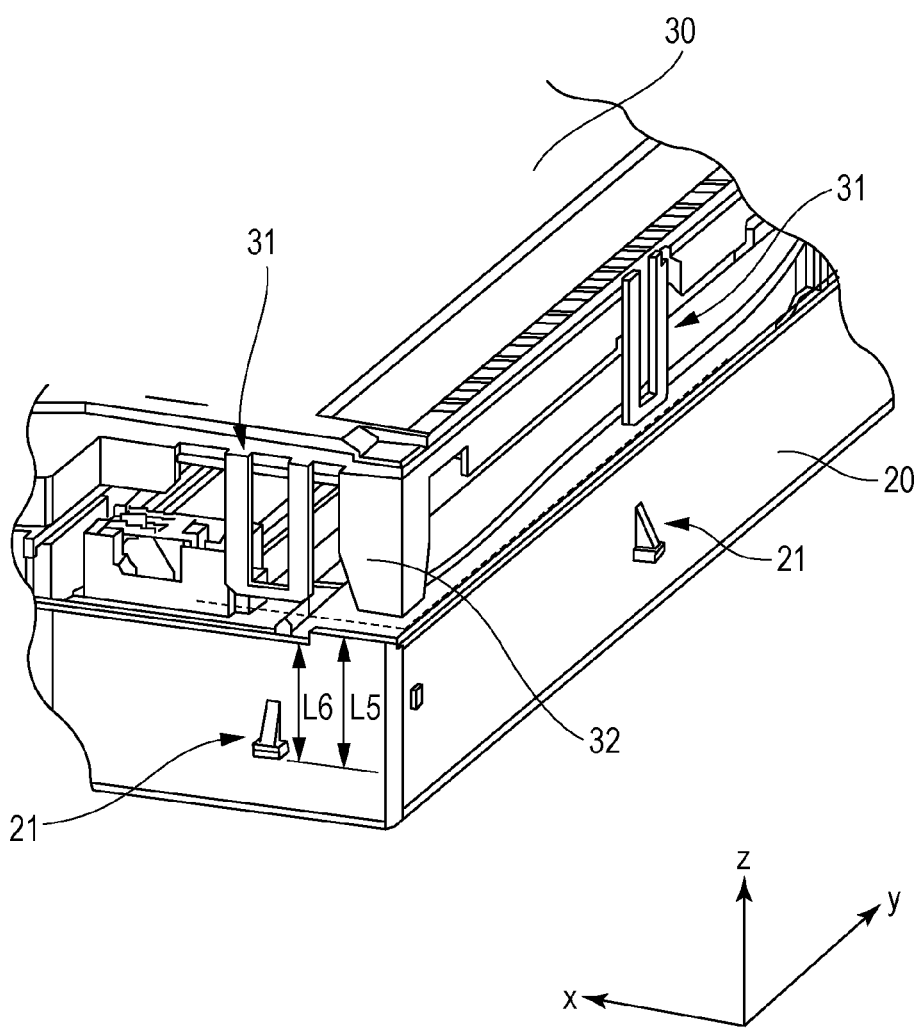
FIG. 6 is an enlarged perspective view of a principal portion of the optical box and the cover.

FIG. 6 is a modification of Example 1. Reference sign L5 is a distance between the optical box-side engaging portion 21 and the apex portion of the side wall at a portion opposing the protrusion 32 in the Z-axis direction. Reference sign L6 is a distance between the optical box-side engaging portion 21 and the apex portion of the side wall at a portion opposing the cover-side engaging portions 31 in the Z-axis direction. In the case of the cover in which the lengths of the protrusion 32 and the cover-side engaging portion 31 are equal, the optical box 20 is designed so as to satisfy L5>L6, so that the optical scanning apparatus may be configured so that the protrusions 32 pass the apex portions 20*b* of the side wall 20*a* prior to the cover-side engaging portions 31 when mounting the cover 30 on the optical box 20.

In the case of a cover having the cover-side engaging portions 31 longer than the protrusion 32, the optical box 20 is designed so as to satisfy L5>L6 and have a difference between L5 and L6 larger than a difference between the length of the cover-side engaging portions 31 and the length of the protrusion 32, so that the optical scanning apparatus may be configured so that the protrusions 32 passes the apex portion of the side wall 20*a* prior to the cover-side engaging portions 31 when mounting the cover 30 on the optical box 20.

As described thus far, since the distal end portions 32*a* of the protrusions 32 and the apex portion 20*b* of the side wall 20*a* of the optical box 20 pass each other prior to the distal end portions 31*a* of the cover-side engaging portions 31, the distal end portions 31*a* of the cover-side engaging portions 31 are restrained from coming into contact with the side wall 20*a*, whereby the plastic deformation of the cover-side engaging portions 31 when mounting the cover on the optical box 20 may be restrained.

When assembling the dust-proof cover on the optical box of the optical scanning apparatus, the plastic deformation of the cover-side engaging portions may be restrained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-267130, filed Dec. 25, 2013 which is hereby incorporated by reference herein in its entirety.

What is claimed is:

1. An optical scanning apparatus comprising:
a light source configured to emit a light beam for exposing a photosensitive member;
a rotary polygonal mirror configured to deflect the light beam emitted from the light source so as to scan the photosensitive member;
an optical box configured to house the rotary polygonal mirror in an interior thereof and provided with a plurality of box engaging portions at a plurality of positions on an outer surface of a wall of the optical box; and
a cover mounted on the optical box and provided with a plurality of first protrusions and a plurality of second protrusions along the outer surface,
wherein each of the first protrusions is provided with a cover engaging portion configured to engage one of the plurality of box engaging portions and the plurality of cover engaging portions engages the plurality of the box engaging portions respectively to fix the cover to the optical box,
wherein the plurality of second protrusions protrudes from corners of the cover when looked from a direction of rotating axis of the rotary polygonal mirror,
wherein the plurality of the first protrusions and the plurality of the second protrusions are provided to the cover so that a distal end of at least one of the plurality of the second protrusions and a top portion of the wall pass each other prior to timing when distal ends of the first protrusions and the top portion of the wall of the optical box pass each other when mounting the cover on the optical box, and
wherein the distal ends of the plurality of the second protrusions function as guide members for determining the direction of relative movement between the cover and the optical box while moving along the wall by either allowing or restricting movement between the cover and the optical box.

2. The optical scanning apparatus according to claim 1, wherein the length of the second protrusions in the direction of rotating axis of the rotary polygonal mirror is longer than a length of the cover engaging portions in the direction of rotating axis of the rotary polygonal mirror, so that deformation of the cover engaging portion caused by contact between the distal end of the first protrusions and the top portion of the wall is restrained.

3. The optical scanning apparatus according to claim 1, wherein a direction of relative movement between the cover and the optical box at the time when the cover is mounted on the optical box is a direction substantially parallel to the rotating axis of the rotary polygonal mirror, and an extending direction of the first protrusions and the second protrusion from the cover is a direction substantially parallel to the rotating axis of the rotary polygonal mirror.

4. The optical scanning apparatus according to claim 3, wherein the length of the second protrusions in the direction of rotating axis of the rotary polygonal mirror is longer than a length of the first protrusions in the direction of rotating axis of the rotary polygonal mirror.

5. The optical scanning apparatus according to claim 1, wherein the plurality of the second protrusions guides the direction of relative movement between the cover and the optical box when mounting the cover on the optical box.

6. The optical scanning apparatus according to claim 1, wherein the cover is formed of a resin.

7. A light source configured to emit a light beam for exposing a photosensitive member;
a rotary polygonal mirror configured to deflect the light beam emitted from the light source so as to scan the photosensitive member;
an optical box configured to house the rotary polygonal mirror in an interior thereof and provided with a plurality of box engaging portions at a plurality of positions on an outer surface of a wall of the optical box; and
a cover mounted on the optical box and provided with a plurality of first protrusions and a plurality of second protrusions along the outer surface;
wherein each of the first protrusions is provided with a cover engaging portion configured to engage one of the plurality of box engaging portions and the plurality of cover engaging portions engages the plurality of the box engaging portions respectively to fix the cover to the optical box,
wherein the plurality of second protrusions protrudes from corners of the cover when looked from a direction of rotating axis of the rotary polygonal mirror,
wherein the plurality of the first protrusions and the plurality of the second protrusions are provided to the cover so that a distal end of at least one of the plurality of the second protrusions and a top portion of the wall pass each other prior to timing when distal ends of the first protrusions and the top portion of the wall of the optical box pass each other when mounting the cover on the optical box.

8. The optical scanning apparatus according to claim 7, wherein a direction of relative movement between the cover and the optical box at the time when the cover is mounted on the optical box is a direction substantially parallel to the rotating axis of the rotary polygonal mirror, and a extending direction of the first protrusions and the second protrusion from the cover is a direction substantially parallel to the rotating axis of the rotary polygonal mirror.

9. The optical scanning apparatus according to claim 7, wherein the length of the second protrusions in the direction of rotating axis of the rotary polygonal mirror is longer than a length of the first protrusions in the direction of rotating axis of the rotary polygonal mirror.

10. The optical scanning apparatus according to claim 7, wherein the plurality of the second protrusions guides the direction of relative movement between the cover and the optical box when mounting the cover on the optical box.

* * * * *